(12) United States Patent
Sorce

(10) Patent No.: US 6,811,686 B1
(45) Date of Patent: Nov. 2, 2004

(54) APPARATUS FOR FILTERING AND COOLING MOTORCYCLE ENGINE OIL

(76) Inventor: Tony Sorce, 2365 Industrial Dr., Yuba City, CA (US) 95993

( * ) Notice: Subject to any disclaimer, the term of this patent is extended or adjusted under 35 U.S.C. 154(b) by 118 days.

(21) Appl. No.: 10/242,578

(22) Filed: Sep. 12, 2002

(51) Int. Cl.⁷ .............................................. B01D 35/18
(52) U.S. Cl. ........................ 210/168; 210/171; 210/186; 210/444; 123/196 A; 123/196 AB; 180/229; 184/104.3
(58) Field of Search .............................. 210/444, 168, 210/186, 171; 123/196 A, 196 AB; 180/229; 184/104.3

(56) References Cited

U.S. PATENT DOCUMENTS

| | | | |
|---|---|---|---|
| 4,295,964 A | | 10/1981 | Preisler |
| 4,324,213 A | * | 4/1982 | Kasting et al. .......... 123/196 A |
| 4,831,980 A | * | 5/1989 | Nasu et al. .............. 123/196 A |
| 5,548,893 A | | 8/1996 | Koelfgen |
| 5,647,306 A | * | 7/1997 | Pateman ................... 123/41.33 |
| 5,740,772 A | * | 4/1998 | Bluma ................... 123/196 AB |
| 5,887,561 A | * | 3/1999 | Spurgin ................ 123/196 AB |
| 6,261,448 B1 | * | 7/2001 | Merchant et al. ........... 210/184 |

* cited by examiner

*Primary Examiner*—Terry K. Cecil
(74) *Attorney, Agent, or Firm*—Thomas R. Lampe

(57) ABSTRACT

Apparatus of unitary construction and including an oil filter support, an oil cooler and an oil filter is employed to filter and cool engine oil, the oil passing along a serpentine path in the oil cooler after being filtered and before being returned to the motorcycle.

4 Claims, 3 Drawing Sheets

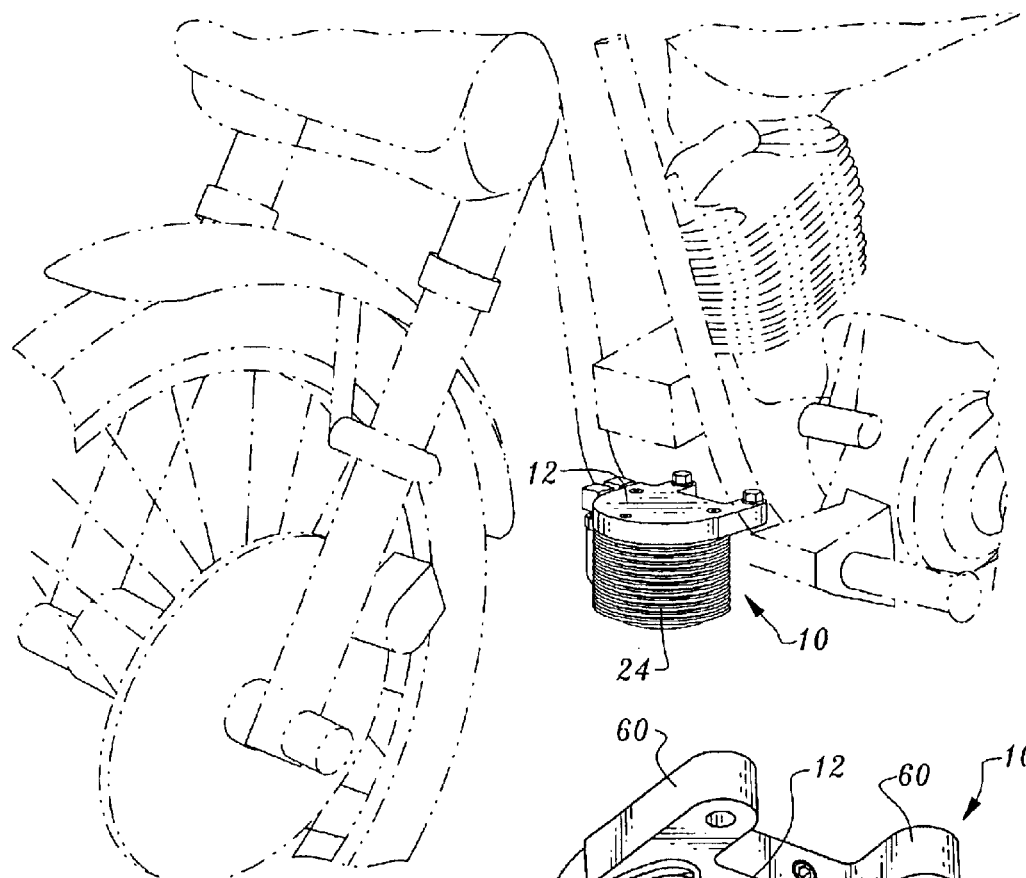
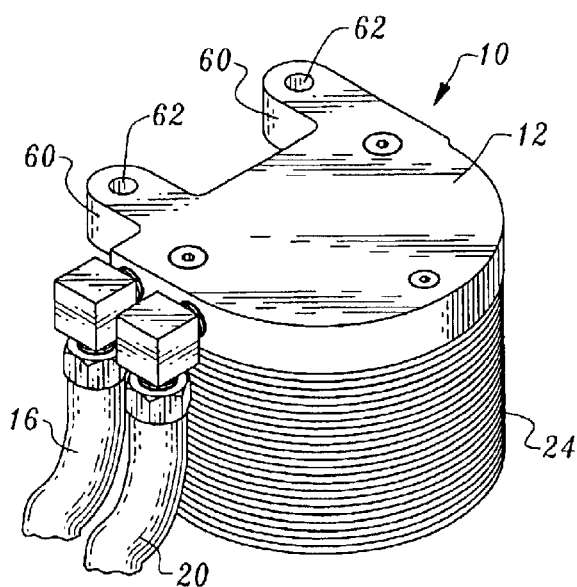
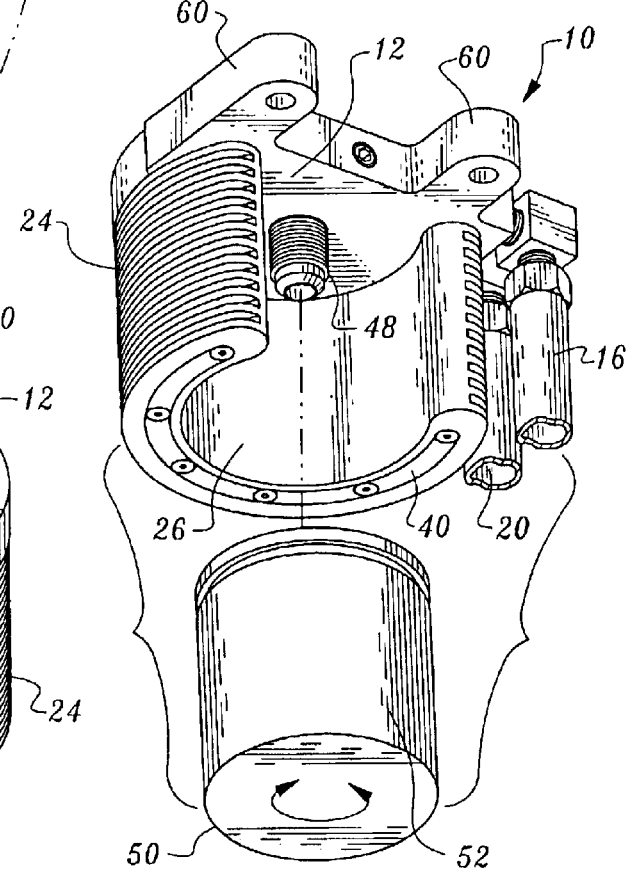
Fig. 1
Fig. 2
Fig. 3

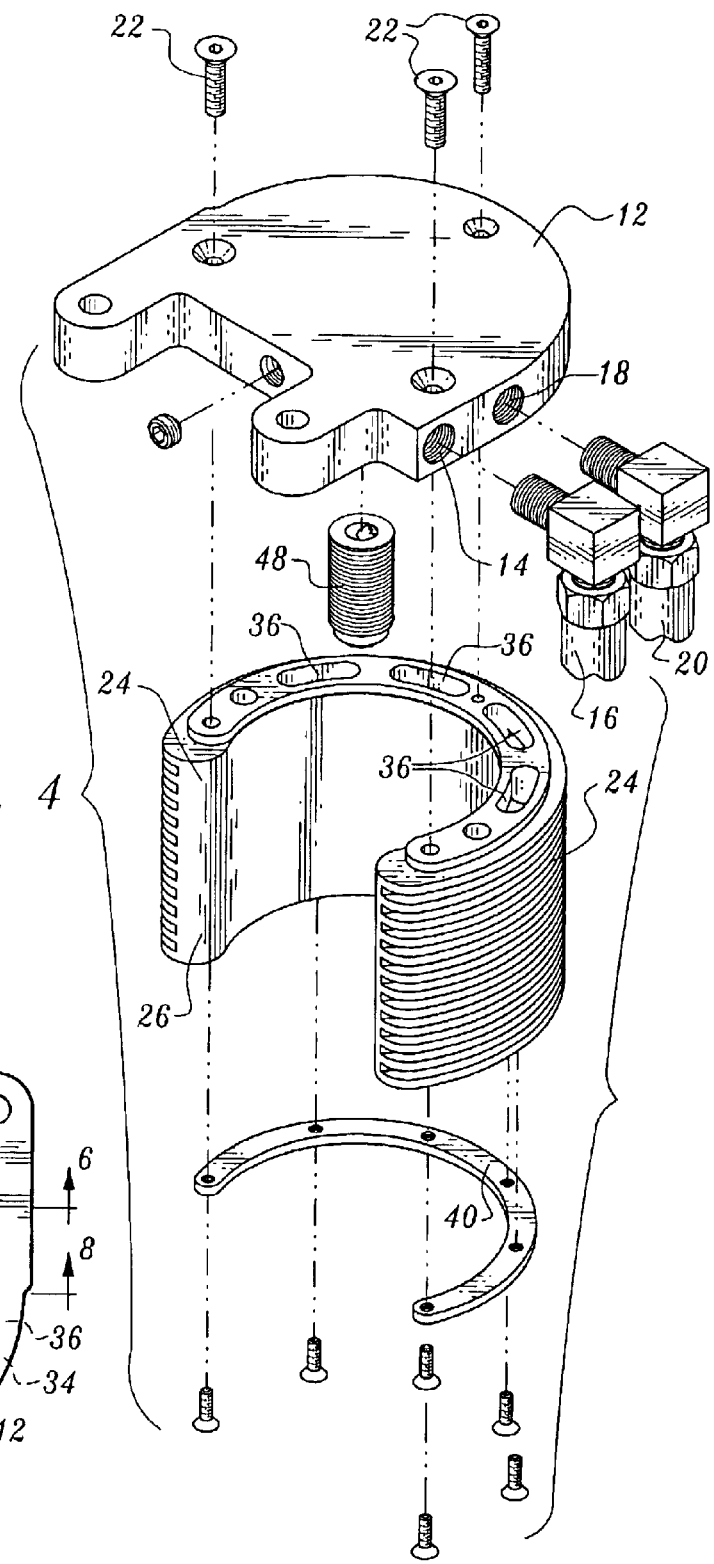
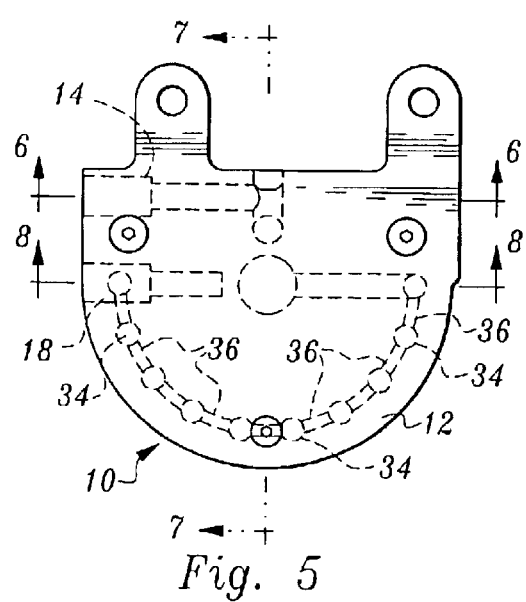
Fig. 4
Fig. 5

APPARATUS FOR FILTERING AND COOLING MOTORCYCLE ENGINE OIL

TECHNICAL FIELD

This invention relates to apparatus of unitary construction for attachment to a motorcycle for filtering and cooling engine oil. The apparatus can be readily retrofit to an existing motorcycle or incorporated in a motorcycle during manufacture thereof.

BACKGROUND OF THE INVENTION

Under certain conditions, engine oil of motorcycles can overheat and lead to certain undesirable consequences such as a breakdown in the lubricating characteristics of the engine oil and undue engine wear.

As will be seen in greater detail below, the apparatus of the present invention provides a unitary structure which incorporates an oil filter, an oil filter support and an oil cooler which are combined in a single unit facilitating installation. The unit is compact. It occupies minimal space on a motorcycle while at the same time efficiently performing the dual activities of filtering and cooling the engine oil of the motorcycle.

The apparatus is also characterized by its simplicity and reliability of construction. Although combination oil coolers and filters have been devised and employed in the past they do not incorporate the unique features of the present invention which cooperate to provide high efficiency cooling.

U.S. Pat. No. 4,295,964, issued Oct. 20, 1981, illustrates a prior art filtering/cooling apparatus employed on a motorcycle. U.S. Pat. No. 5,548,893, issued Aug. 27, 1976, shows a spin-on oil filter replacement element incorporating a cannister (see FIG. 5 of the patent) including fins on its exterior surface for promoting oil cooling.

The unique combination of structural elements of the invention disclosed and claimed herein are not taught or suggested by these patents, whether taken alone or in combination.

DISCLOSURE OF INVENTION

The present invention relates to apparatus of unitary construction for attachment to a motorcycle for filtering and cooling engine oil.

The apparatus includes an oil filter support having a primary oil inlet for receiving engine oil from the motorcycle, a primary oil outlet for returning engine oil to the motorcycle, a secondary oil inlet and a secondary oil outlet.

Connector means is provided for connecting the oil filter support to the motorcycle.

An oil cooler is attached to the oil filter support and defines an air cooled chamber.

The combination also includes an oil filter having a housing attached to the oil filter support. The housing and the oil filter support define a space in fluid flow communication with the primary oil inlet for receiving the engine oil from the primary oil inlet and the space is further in fluid flow communication with the secondary oil inlet for delivering the engine oil to the secondary oil inlet after passage of the engine oil through the space.

The secondary oil inlet is for delivering the engine oil to the secondary oil outlet and to the air cooled chamber. The primary oil outlet is for receiving the engine oil from the air cooled chamber and for returning the engine oil to the motorcycle.

Other features, advantages and objects of the present invention will become apparent with reference to the following description and accompanying drawings.

BRIEF DESCRIPTION OF DRAWINGS

FIG. 1 is a perspective view of apparatus constructed in accordance with the teachings of the present invention attached to the frame of a motorcycle, the motorcycle being depicted in phantom lines;

FIG. 2 is a perspective view of the apparatus and illustrating engine oil lines attached to the oil filter support of the apparatus;

FIG. 3 is a bottom, perspective view illustrating the apparatus oil filter prior to attachment to the oil filter support;

FIG. 4 is an exploded, perspective view of selected structural elements of the apparatus;

FIG. 5 is a top, plan view illustrating the oil filter support of the apparatus, with certain features thereof depicted in dash lines;

BEST MODE FOR CARRYING OUT THE INVENTION

Figure 6:
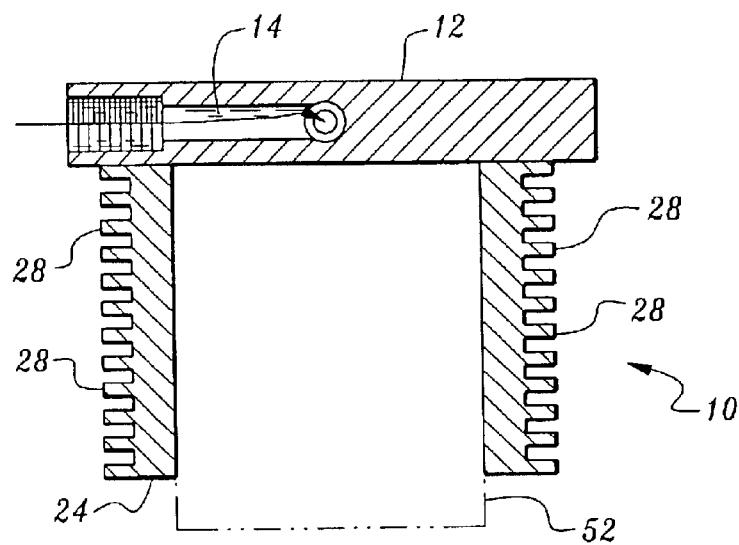
FIG. 6 is an enlarged, cross-sectional view taken along the line 6—6 of FIG. 5 and illustrating the oil filter of the apparatus in phantom lines.

FIG. 1 illustrates apparatus 10 constructed in accordance with the teachings of the present invention mounted on the frame of a motorcycle, the motorcycle being depicted by phantom lines.

The apparatus 10 includes an oil filter support in the form of a support member 12 of rigid construction and having a plate-like configuration.

The oil filter support has a primary oil inlet 14 for receiving engine oil from the oil pump of the motorcycle through an engine oil line 16 threadedly connected to the oil filter support.

The oil filter support 12 also has a primary oil outlet 18 to which engine oil line 20 is threadedly connected for returning engine oil to the motorcycle engine after passage thereof through the apparatus.

Attached to the underside of oil filter support 12 by threaded fasteners 22 is an air cooler 24. Air cooler 24 includes an oil cooler side wall 26 which has a generally U-shaped configuration and which includes heat dissipating outwardly directed fins 28.

The oil cooler 24 defines an air cooled chamber comprising a serpentine engine oil flow path 30. The flow path 30 comprises a plurality of spaced, vertically disposed flow path sections 34 (see FIG. 5) interconnected by spaced, horizontally disposed flow path sections 36 disposed at the top and bottom of the oil cooler. The flow path sections 36 of the top and bottom are staggered or offset relative to each other. The top of the oil cooler engages the bottom of the support 12 so that oil flow is confined to the flow path at that interface. A U-shaped closure plate 40 is secured to the bottom of the air cooler by threaded fasteners to confine engine oil flow to the flow path at that interface. Thus, it will be understood that engine oil flowing through the air cooler flows alternately up and down as it makes its way along the length of the oil cooler.

In addition to primary oil inlet 14 and primary oil outlet 18, the oil filter support 12 defines a secondary oil inlet 44 and a secondary oil outlet 46.

Figure 7:
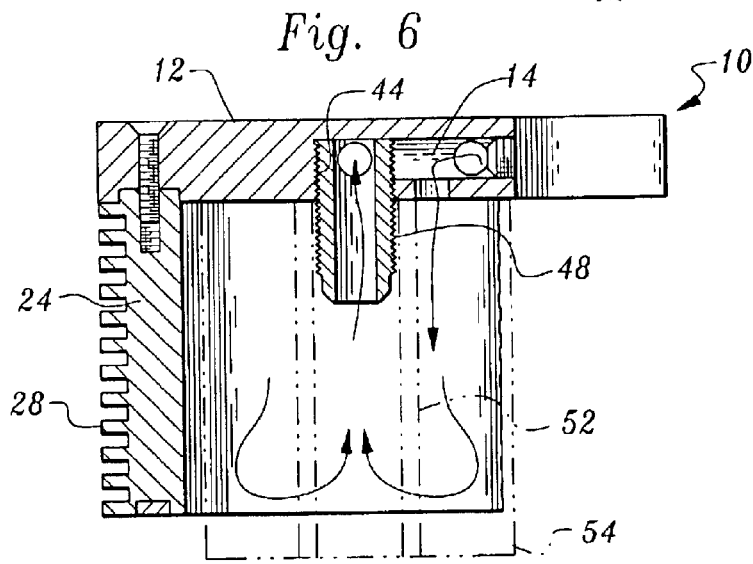
FIG. 7 is an enlarged, cross-sectional view taken along the line 7—7 of FIG. 5 and showing oil flow through components of the invention.

Threadedly engaged with the oil filter support 12 at the secondary oil inlet is an externally threaded attachment nipple 48. Also threadedly engaged with the attachment nipple is oil filter 50 having a housing 52. It is to be understood, of course, that the housing interior contains a filtration element 54 of suitable conventional nature. When the oil filter 50 is attached to the oil filter support, the housing interior is in fluid flow communication with primary oil inlet 14. Engine oil moves into the interior of the housing and passes through the filtration element 54 as shown by the arrows in FIG. 7.

Figure 8:
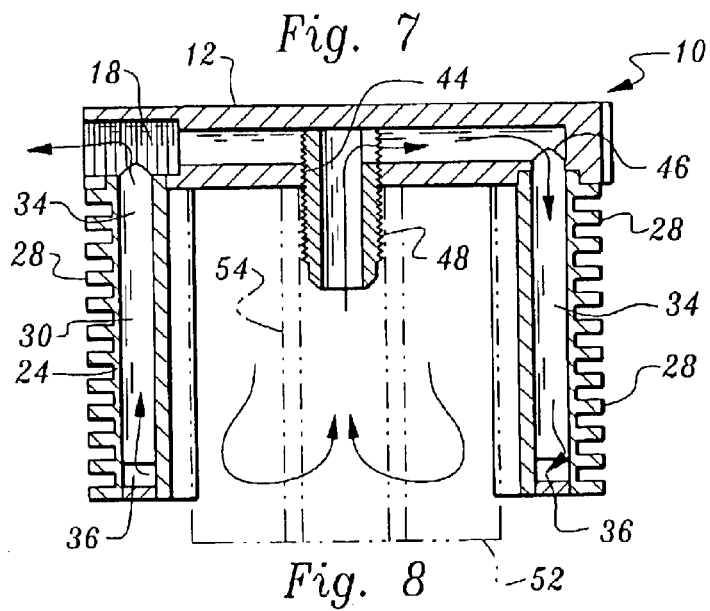
FIG. 8 is an enlarged, cross-sectional view taken along the line 8—8 in FIG. 5, again depicting engine oil flow by arrows.

The oil then moves upwardly through the nipple 48 and out of secondary oil outlet 46 into an end-most, vertically disposed flow path section 34 of the oil cooler as shown in FIG. 8. The engine oil then works its way along the serpentine path defined by flow path sections 34, 36 until the oil reaches primary oil outlet 18 and its associated engine oil line 20. Because the engine oil remains in contact with the oil cooler over a considerable distance, substantial cooling of the engine oil takes place.

As stated above, attachment and removal of the apparatus are quickly and efficiently accomplished. Connector lugs 60 project from the support member 12 and define openings 62 which accommodate bolts (see FIG. 1) employed to secure the apparatus to the motorcycle frame. Relocation of the oil filter from its normal position on the motorcycle results in unobstructed air flow; thus, the engine runs cooler. In addition to its cooling function, the air cooler provides protection for the oil filter in its relocated position.

What is claimed is:

1. Apparatus of unitary construction for attachment to a motorcycle for filtering and cooling engine oil, said apparatus comprising, in combination:

an oil filter support member of rigid construction having a primary oil inlet for receiving engine oil from the motorcycle, a primary oil outlet for returning engine oil to the motorcycle, a secondary oil inlet and a secondary oil outlet;

connector means for connecting said oil filter support to the motorcycle;

an oil cooler attached to said oil filter support and supported thereby, said air cooler defining an air cooled chamber and having a generally U-shaped configuration;

an oil filter having a housing attached to said oil filter support, said housing and said oil filter support defining a space in fluid flow communication with said primary oil inlet for receiving the engine oil from said primary oil inlet via said oil filter and said space further in fluid flow communication with said secondary oil inlet for delivering the engine oil to said secondary oil inlet after passage of the engine oil through said space, said secondary oil inlet for delivering the engine oil to said secondary oil outlet and to said air cooled chamber, and said primary oil outlet for receiving the engine oil from said air cooled chamber and for returning the engine oil to the motorcycle;

a threaded attachment nipple threadedly attaching said oil filter to said oil filter support to support said oil filter, said threaded attachment nipple defining a fluid flow passageway between said oil filter and said secondary outlet; and engine oil lines attached to said oil filter support at said primary oil inlet and said primary oil outlet, said air cooler partially surrounding said housing and disposed in front of and to the sides of said housing along the length of the housing to protect the housing against impact and including heat dissipating, outwardly directed, radially spaced fins disposed in front of and to the sides of said housing, said air cooled chamber comprising a serpentine engine oil flow path located between said secondary oil outlet and said primary oil outlet and extending substantially the full length of said air cooler, said fins extending away from said serpentine engine oil flow path.

2. The apparatus according to claim 1 wherein said connector means includes at least one connector lug affixed to and projecting from said support member, said at least one connector lug defining an aperture for receiving a threaded fastener employable to attach the support member to the frame of the motorcycle.

3. The apparatus according to claim 1 wherein said support member has a plate-like configuration.

4. The apparatus according to claim 1 wherein portions of said serpentine engine oil flow path comprise openings at opposed ends of said air cooler, said apparatus additionally comprising a U-shaped closure plate covering the openings at one of said ends and said support member covering the openings at the other of said ends.

* * * * *